United States Patent [19]
Thimmesch

[11] Patent Number: 5,743,242
[45] Date of Patent: Apr. 28, 1998

[54] AIR INTAKE HEATER WITH CONNECTOR POSTS

[75] Inventor: Jan P. Thimmesch, Eden Prairie, Minn.

[73] Assignee: Phillips & Temro Industries Inc., Eden Prairie, Minn.

[21] Appl. No.: 582,747

[22] Filed: Jan. 4, 1996

[51] Int. Cl.$^6$ ................................................. F02M 31/00
[52] U.S. Cl. ................................................. 123/549
[58] Field of Search ................................. 123/549, 543, 123/545, 546, 547, 556

[56] References Cited

U.S. PATENT DOCUMENTS

| | | |
|---|---|---|
| 909,898 | 1/1909 | Hertzberg et al. . |
| 1,068,322 | 7/1913 | Church et al. . |
| 1,136,845 | 4/1915 | Tate . |
| 1,369,551 | 2/1921 | Schmid . |
| 1,456,018 | 5/1923 | Wiegand . |
| 1,724,481 | 8/1929 | Heginbottom et al. . |
| 1,931,379 | 10/1933 | Graziano . |
| 1,931,837 | 10/1933 | Belanger . |
| 2,115,634 | 4/1938 | Kiesel . |
| 2,177,840 | 10/1939 | Roualet . |
| 2,668,900 | 2/1954 | Kwartz . |
| 3,088,447 | 5/1963 | Henderson . |
| 3,492,457 | 1/1970 | Subt . |
| 3,625,190 | 12/1971 | Boissevain . |
| 3,892,215 | 7/1975 | Hickling et al. . |
| 4,020,812 | 5/1977 | Hayward . |
| 4,106,454 | 8/1978 | Henlis . |
| 4,108,125 | 8/1978 | Marcoux et al. . |
| 4,363,958 | 12/1982 | Kobayashi et al. . |
| 4,395,994 | 8/1983 | Goto et al. . |
| 4,463,721 | 8/1984 | Hayashi et al. . |
| 4,501,255 | 2/1985 | Van Der Ploeg et al. . |
| 4,651,702 | 3/1987 | Nara et al. . |
| 4,667,645 | 5/1987 | Gluckman . |
| 4,685,437 | 8/1987 | Tanaka et al. . |
| 4,870,249 | 9/1989 | Kayanuma et al. . |
| 4,944,260 | 7/1990 | Shea et al. . |
| 5,000,152 | 3/1991 | McCauley ............................... 123/549 |
| 5,327,874 | 7/1994 | Pugachev et al. ...................... 123/549 |

FOREIGN PATENT DOCUMENTS

| | | |
|---|---|---|
| 648536 | 12/1928 | France . |
| 62-91649 | 4/1987 | Japan . |

*Primary Examiner*—Marguerite McMahon
*Attorney, Agent, or Firm*—Harness, Dickey & Pierce, P.L.C.

[57] ABSTRACT

A heating device for use in the cylinder head of an internal combustion engine for heating the air/fuel mixture entering the cylinder head from the intake manifold. The heating device includes a frame or mounting member supporting an electric heating element having a plurality of resistance ribbons coupled to the mounting member by a plurality of mounting posts preferably formed by a plurality of threaded bolts. A power source may be electrically connected to one end of the heating element thereby providing an electric current which passes through the resistance ribbons. A securing arrangement, including a plurality of nuts threaded to cooperate with the threaded bolts and a plurality of conducting and insulating spacers disposable on the bolts, are provided to separate and rigidly couple the resistance ribbons to the mounting posts as a result of the compressive forces generated by the tightening of the bolts relative to the threaded nuts. The heating device allows the resistance ribbons to be connected in parallel or in series with the power source.

26 Claims, 4 Drawing Sheets

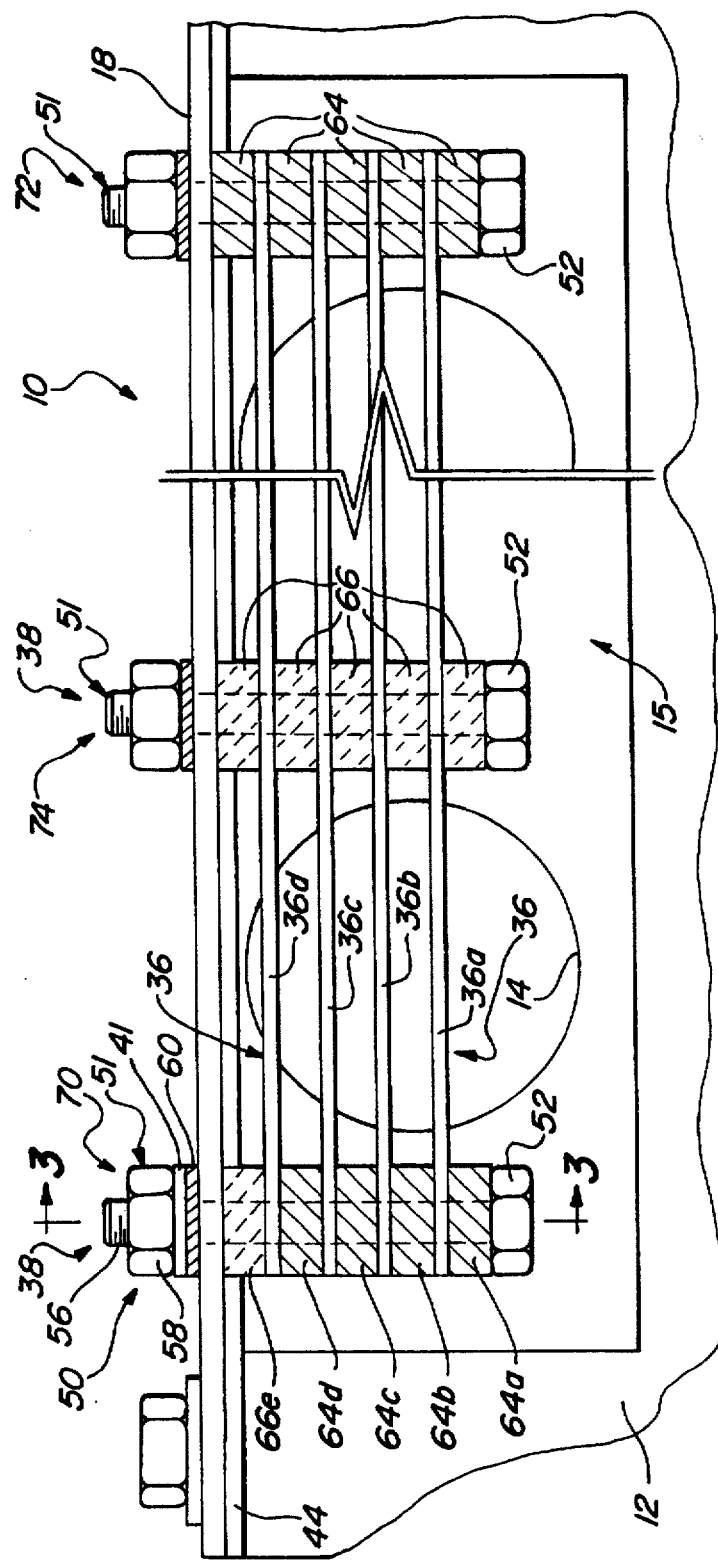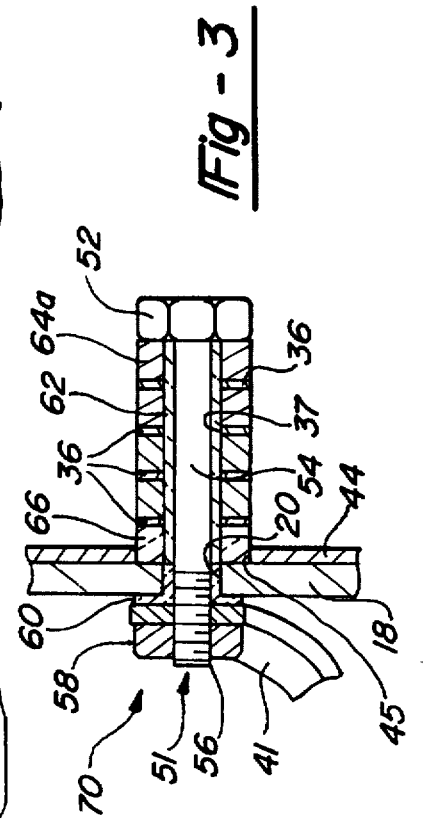

AIR INTAKE HEATER WITH CONNECTOR POSTS

BACKGROUND OF THE INVENTION

1. Technical Field

This invention generally relates to electrical heaters and, more particularly, to an apparatus for heating the air/fuel mixture entering the cylinder of an internal combustion engine.

2. Discussion

The prior art has addressed the desirability of heating the environment of the intake manifold including the air/fuel mixture exiting the carburetor of an internal combustion engine in order to increase fuel economy and decrease pollutant discharge. One type of intake heating device generally includes a pair of gaskets surrounding a heating coil or grid disposed between the carburetor and the air intake manifold as shown in U.S. Pat. No. 4,020,812 to Hayward and U.S. Pat. No. 4,106,454 to Henlis. The gaskets in these devices not only prevent air leaks into and out of the manifold but also thermally and electrically isolate the grid from the intake structure. However, as recognized and addressed in pending application Ser. No. 08/493,486, entitled "Low Profile Intake Manifold Heater", filed Jun. 22, 1995, gasket wear or aging may eventually short the electric circuit through the heating element.

The invention disclosed in application Ser. No. 08/493,486 minimizes concerns relating to shorting of the heating element circuit by recessing at least one continuous coil type heating element in a mounting frame. The heating element is coupled to insulating material that thermally and electrically isolates the heating element from the mounting frame. Additionally, the heating element is shaped to nest within the insulating material which, in turn, floats within a mounting channel formed in the frame. As a result of this floating arrangement, the mounting channel and insulating material cooperate to structurally support the heating element.

While the invention disclosed in application Ser. No. 08/493,486 has performed satisfactorily, still further improvements can be made, especially where engine designs permit them. For example, the cost of insulating material possessing a structural strength sufficient to support the coils, such as a ceramic, is generally greater than the cost of insulated material having less structural integrity. In light of these issues, it is desirable to provide a heating element that rigidly connects a plurality of heating ribbons to a frame or mounting member such that the mounting apparatus exhibits sufficient structural strength to resist the vibrational stresses created by the engine while isolating the electrical connection from the gaskets of the heating device.

A further deficiency present in some of the heater devices is that the heating grids used therein generally consist of a single continuous coil of resistance wire or ribbon having one end connected to an electric power source and a second end connected to ground. While such continuous coils of resistance ribbon may effectively heat the intake air/fuel mixture in the specific applications for which the coils are designed, continuous coils provide only a single heating capacity for a given supply voltage. Thus, if a different heating capacity is desired in a given application, the entire heating coil must often be replaced with a new element having the appropriate resistance or, alternatively, the supply voltage may be changed. The present invention provides a heating element wherein the heating capacity of the resistance ribbon may be varied by adjusting the length of resistance ribbon in the circuit or changing the circuit from a plurality of ribbon elements electrically connected in series to a plurality of ribbon elements connected in parallel.

SUMMARY OF THE INVENTION

One object of the present invention is to provide an improved electric heater device having a plurality of resistance ribbons electrically connectable in series or in parallel.

Another object of the present invention is to provide an improved electric heater device including a mounting member and securing means for rigidly connecting resistance ribbons to the mounting member thereby minimizing concerns relating to vibrational stresses created by the engine and increasing the durability of the heater device.

It is an additional object of the present invention to improve the airflow and heat transfer characteristics of an engine heater device by providing securing means that rigidly connect the resistance ribbons to the mounting member without the need for a frame having side walls.

A further object of the present invention is provide an electric heater device wherein the resistance ribbons are coupled to the mounting member so that when the mounting member is connected to the intake housing of the internal combustion engine, the resistance ribbons are located proximate to the engine cylinders thereby minimizing the distance from the resistance ribbons to the combustion chamber and the heat lost by the heated air/fuel mixture when traveling this distance.

It is also an object of the present invention to provide an improved heater device using plate-like resistance ribbon sections thereby eliminating concerns over the manufacturing stresses created and tolerances required in bending resistance ribbons.

Another object of the present invention is to provide an electric heater device wherein the heating element may be disassembled into a plurality of plates, bolts, nuts, insulators and spacers thereby decreasing the size and costs associated with shipping the device.

Accordingly, the invention provides an electric heater device having a mounting member supporting a heater element and connectable to the cylinder head of an internal combustion engine. Gaskets provide a seal between the mounting member and the surrounding cylinder head and, if necessary, the heating device cover. The heater device includes a plurality of resistance ribbons removably yet rigidly connected to the mounting member by securing means that preferably include a plurality of bolts, cooperating nuts, insulating sleeves and conductive and insulating spacers. Each bolt cooperates with an insulating sleeve to provide a nonconducting mounting post upon which the resistance ribbons are disposed and separated by the spacers to create a grid of ribbons electrically connectable in parallel or in series.

BRIEF DESCRIPTION OF THE DRAWINGS

The objects and features of this invention will become further apparent from a reading of the following detailed description taken in conjunction with the drawings, in which:

FIG. 2 is a partial sectional view taken along the lines 2—2 of FIG. 1 and illustrates the heating element connection to the mounting member and the resistance ribbons electrically connected in parallel;

FIG. 3 is a sectional view taken along the lines 3—3 of FIGS. 1 and 2 and illustrating a sectional view of the first end mounting post and securing means;

DETAILED DESCRIPTION OF THE PREFERRED EMBODIMENT

Figure 1:
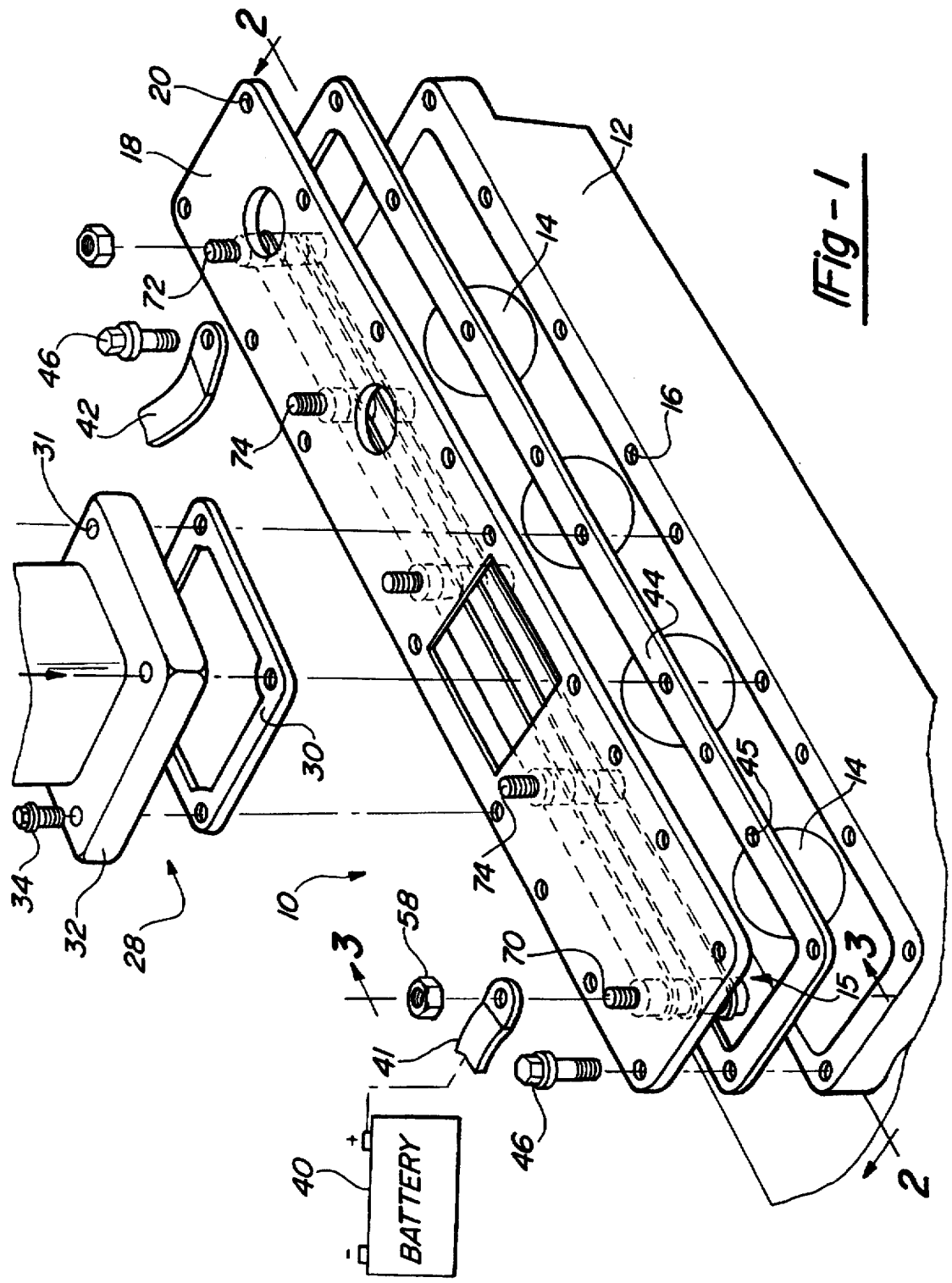
FIG. 1 is an exploded perspective of a first embodiment of the heating device made in accordance with the teachings of this invention as assembled and mounted to a cylinder head in an internal combustion engine.

With reference to FIG. 1, the invention disclosed herein includes a heating device 10 coupled to a cylinder head 12 of an internal combustion engine. Cylinder head 12 has a plurality of cylinder intake openings 14 and a plurality of threaded bores 16 formed therein. Heating device 10 includes a heating element 15 coupled to a plate-like mounting member 18 having apertures 20 and an air intake opening 22 formed therein. Air intake opening 22 cooperates with an air intake supply apparatus 28 to convey an air/fuel mixture from a carburetor or other source to heating device 10 and intake opening 14. Heating element 15 includes a plurality of mounting posts 38 supporting a plurality of resistance ribbons 36 (FIG. 2) which, when connected to a power source such as a battery 40, generate heat to warm the air/fuel mixture entering cylinder intake opening 14.

Air intake supply apparatus 28 is shown to include a gasket 30 disposable about air intake opening 22 and cooperative with an air intake supply apparatus housing 32. In the preferred embodiment, a plurality of threaded bolts 34 cooperate with a plurality of apertures 31 formed in air intake supply apparatus housing 32 and certain of apertures 20 in mounting member 18 and threaded bores 16 in cylinder head 12 to sealingly couple heating device 10 to intake supply apparatus 28. It should be appreciated, however, that other structures known in the art for conveying an air/fuel mixture to cylinder head 12 may be used without departing from the scope of the present invention. For example, it is contemplated that a formed in place gasket material may be used in lieu of gasket 30.

Heating device 10 further includes a gasket 44 having apertures 45 cooperative with mounting bolts 46 (FIG. 1). Mounting bolts 46 are threaded to cooperate with threaded bores 16 in cylinder head 12 and apertures 20 in mounting member 18 to removably yet sealingly couple heating device 10 to cylinder head 12. It should be appreciated that mounting member 18 may be electrically connected to cylinder head 12 by a ground strap 42 or directly connected thereto by threaded mounting bolts 46.

Turning now to the structure of and support for heating element 15, mounting posts 38 are coupled to mounting member 18 and preferably include a first end post 70 electrically connected to a battery 40, a second end post 72, and a plurality of intermediate posts 74. In the embodiment shown in FIGS. 1–3 and as most clearly illustrated in FIG. 2, mounting posts 38 are coupled to mounting member 18 so as to locate resistance ribbons 36 proximate to intake openings 14 in cylinder head 12. This arrangement minimizes the distance that the air/fuel mixture must travel to reach the combustion chambers of the internal combustion engine (not shown) following heating by resistance ribbons 36. As a result, the efficiency of the heating device disclosed herein is improved without requiring additional resistance ribbons or increased energy consumption.

With referenced to FIGS. 2 and 3, heating device 10 includes securing means 50 for connecting mounting posts 38 to mounting member 18. In the embodiment shown in FIGS. 1–3, a bolt 51, including a bolt head 52, a body portion 54 and a threaded end 56, cooperates with a threaded nut 58 to form securing means 50. Further, an insulator sleeve 62 surrounds bolt 51 thereby forming mounting post 38 upon which a plurality of conducting and nonconducting spacers 64 and 66, respectively, and resistance ribbons 36 are mounted. As illustrated in FIG. 3, a conducting element such as a power strap 41 electrically connects a first end post 70 of mounting posts 38 to battery 40 while an insulator bushing 60 electrically isolates mounting strap 41 from mounting member 18.

Resistance ribbons 36 are generally comprised of electrically conductive material having a predetermined resistivity and are shaped to provide the desired total resistance in the length and space available. Accordingly, resistance ribbons 36 may include a multitude of cross-sectional configurations while, in the preferred embodiment illustrated in the attached figures, resistance ribbons 36 are plate-like members of a length sufficient to extend from first end post 70 to second end post 72. Further, each resistance ribbon includes a plurality of apertures 37 (FIG. 3) having a diameter or opening large enough to cooperate with bolt 51 and insulator sleeve 62 yet small enough to ensure that resistance ribbons 36 contact and are supported and separated by spacers 64, 66. As a result of this arrangement, resistance ribbons 36 are removably yet rigidly held in place by the compressive forces generated by the tightening of threaded bolts 51 relative to threaded nut 58. It should be appreciated by those skilled in the art that each resistance ribbon 36 may also be comprised of a plurality of short plates electrically coupled to one another at mounting posts 38.

Figure 5:
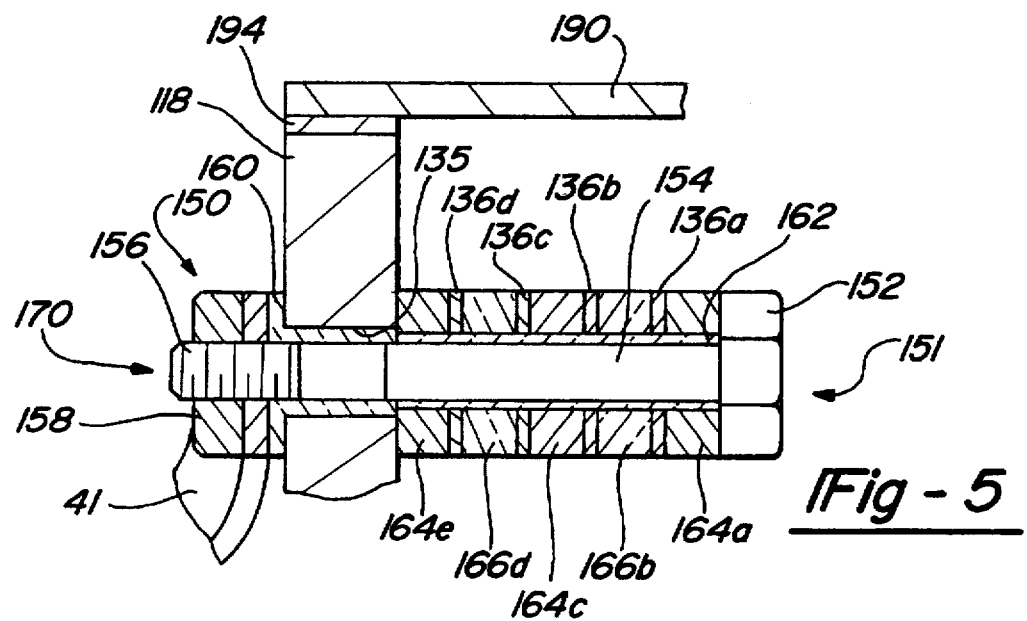
FIG. 5 is a sectional view taken along the lines 5—5 of FIG. 4 illustrating the first end post and securing means when the resistance ribbons are electrically connected in series.
Figure 6:
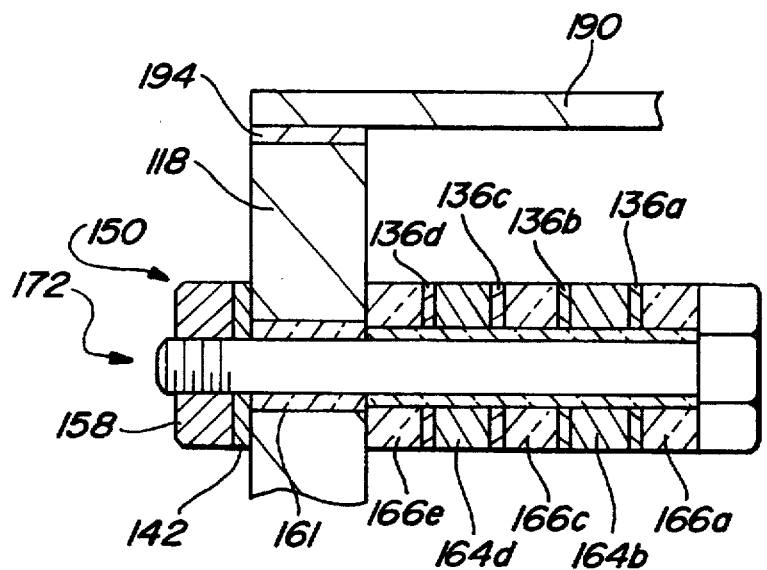
FIG. 6 is a sectional view taken along the lines 6—6 of FIG. 4 and illustrating the second end post and securing means when the resistance ribbons are electrically connected in series.

While mounting posts 38 are shown coupled to frame mounting member 18 through the cooperative arrangement of frame aperture 20, mounting bolt 51 and threaded nut 58, it should be appreciated that any method known in the art for coupling posts to a frame may be used without departing from the intended scope of the claimed invention. However, it is preferred that a removable connection such as that provided by securing means 50 shown in FIGS. 2 and 3 be used to allow adjustment of the arrangement of resistance ribbons 36, conducting spacers 64 and insulating spacers 66 such that resistance ribbons 36 may be electrically connected to battery 40 either in parallel as shown in FIGS. 2 or 3 or in series as shown in FIGS. 5 and 6. Further, removable mounting posts allow partial disassembly of heating element 15 thereby decreasing the shipping size of heating device 10 and the costs associated therewith.

An additional advantage of the removable connection disclosed herein is that additional resistance to the stresses created by engine vibration is provided by the pass-through bolt and nut arrangement shown. Those skilled in the art will further appreciate that the number, spacing, and cross-section of mounting posts 38, particularly intermediate posts 74, is dependent upon the forces to which mounting posts 38 are subjected and the structural strength of resistance ribbons 36. Again, the forces of particular concern are caused by the vibration generated by the engine to which heating device 10 is connected.

Prior to discussing the specific arrangement and relative locations of conducting spacers 64, insulating spacers 66 and resistance ribbons 36, the alternative embodiment of heating device 10 will be described. The heating device shown in FIGS. 4-6 includes several elements substantially identical to the heating device shown in FIGS. 1-3 and previously described herein. Therefore, substantially identical members are referenced in FIGS. 4-6 by substantially identical alphanumeric characters.

Figure 4:
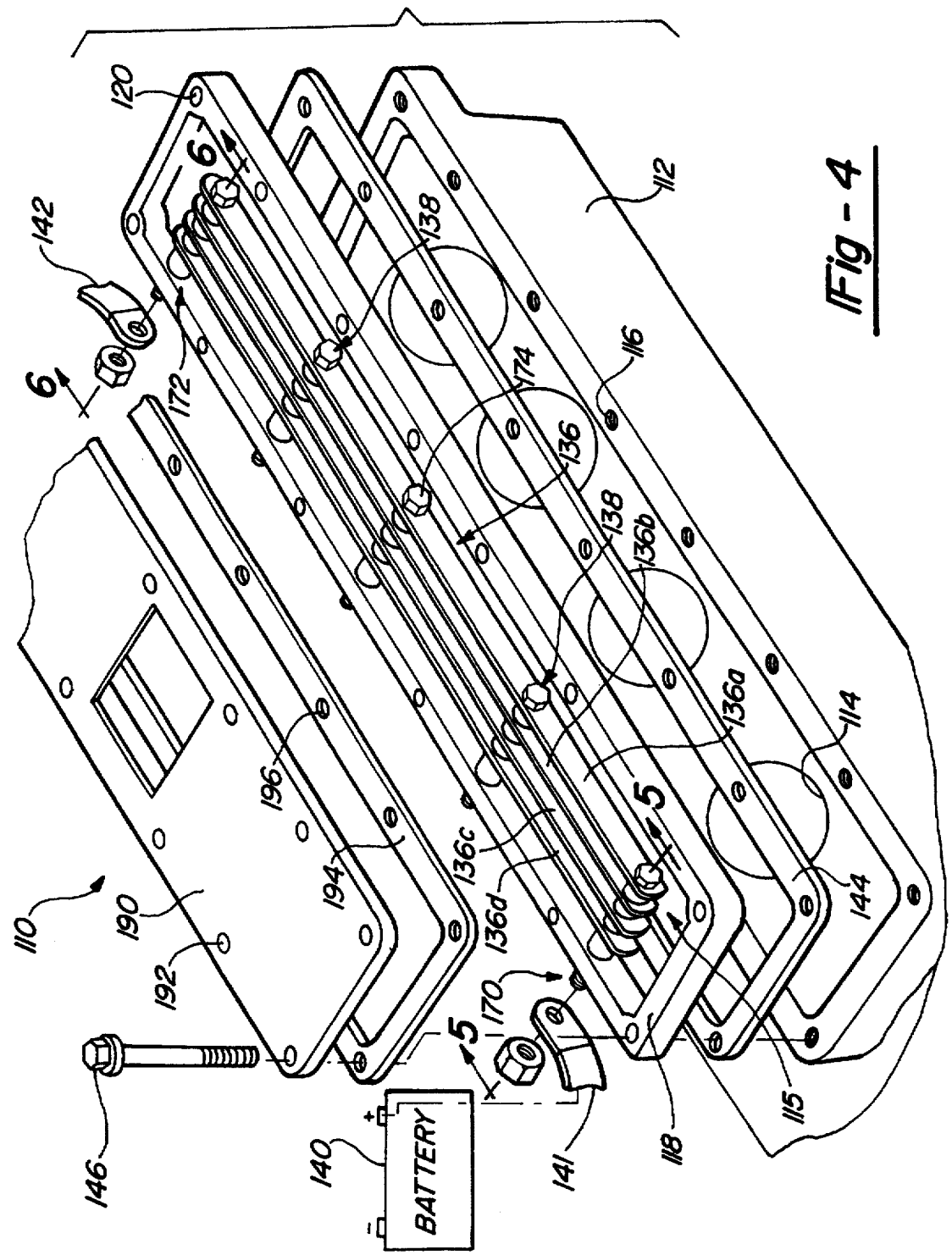
FIG. 4 is an exploded perspective view of a second embodiment of the heating device made in accordance with the teachings of this invention as assembled and mounted to a cylinder head in an internal combustion engine.

FIGS. 4-6 show a heating device 110 coupled to a cylinder head 112 having an intake opening 114 and a plurality of threaded bores 116. Heating device 110 further includes a mounting member 118 having a plurality of mounting apertures 120 cooperative with cylinder head threaded bores 116 such that mounting bolts 146 removably connect mounting member 118 to cylinder head 112. In the embodiment shown in FIG. 4, heating device 110 is shown to include a separate intake cover 190 having apertures 192 and a second gasket 194 having apertures 196. Intake cover 190 includes an air intake opening 122 similar in shape and function as the air intake opening 22 previously described for the embodiment shown in FIG. 1. Mounting bolts 146 removably yet sealingly connect intake cover 190, first and second gaskets 144, 194 and mounting member 118 to cylinder head 112. However, those skilled in the art should appreciate that the intake cover 190 shown in FIG. 4 may be formed integral with mounting member 118 to form a mounting apparatus similar to that shown in FIG. 1 wherein the flow of electric current from battery 140 to heating element 115 is isolated from gaskets 144, 194 by mounting member 118 and insulator bushing 160 as hereinafter described.

Mounting member 118 is provided with a plurality of mounting posts 138 which are preferably removably connected to mounting member 118 through cooperatively sized mounting apertures 135 (FIGS. 5 and 6) having an axial center substantially parallel to the planar surface of intake cover 190 by securing means 150. As will be discussed in further detail hereinafter, securing means 150 is substantially identical to securing means 50 previously discussed and shown in FIGS. 1-3. Further, a plurality of mounting posts 138 again generally include a first end post 170 connected to a power source such as a battery 140 by a conducting strap 141 or other equivalent means and a second end post 172. It should be appreciated by those skilled in the art that mounting member 118 is electrically connected to ground either directly by mounting bolts 146 or through a ground strap 142. When ground strap 142 is used, insulator bushing 160 shown in FIG. 5 is replaced by a second insulating sleeve 161 as shown in FIG. 6.

As best seen in FIGS. 5 and 6, securing means 150 includes a bolt 151 having a head 152, a body portion 154 and a threaded end 156 cooperative with a threaded nut 158. An insulator bushing 160 and insulating sleeve 162 electrically and thermally isolate bolt 151 from mounting member 118 and gaskets 144 and 194 (FIG. 4). Further, a plurality of conducting spacers 164 and insulating spacers 166 cooperate with bolt 151 and threaded nut 158 to structurally support resistance ribbons 136 and electrically connect resistance ribbons 136 to battery 140 and to ground.

With reference to the ability to connect resistance ribbons 36, 136 in the present invention either in parallel or in series with a power source, it will be appreciated by those skilled in the art that the arrangement of conducting and insulating spacers; shown in FIGS. 2 and 3 and hereinafter discussed may be used either in the embodiment shown in FIG. 1 or in the alternative embodiment shown in FIG. 4. Similarly, the arrangement shown in FIGS. 5 and 6 may be used in either embodiment to connect resistance ribbons 36, 136 in series with battery 40, 140. For simplicity, a detailed description of the parallel and serial connections is made only with respect to the embodiment in which the respective connection is shown.

With reference to FIGS. 2 and 3, resistance ribbons 36 are shown electrically connected in parallel with battery 40. First end post 70 is electrically connected to battery 40 by a strap 41 allowing current to flow into mounting bolt 51, through body portion 54, and into bolt head 52. A conducting spacer 64a is shown in contact with bolt head 52 thereby permitting current flow into lowermost resistance ribbon 36a. Additional conducting spacers 64b, 64c and 64d (FIG. 2) electrically interconnect and separate resistance ribbons 36b, 36c and 36d thereby also allowing current to flow therethrough from bolt head 52. An insulating spacer 66e is provided adjacent mounting member 18 to prevent current flow into grounded mounting member 18 from uppermost resistance ribbon 36d.

As best seen in FIG. 2, each of the plurality of intermediate posts 74 include only insulating spacers 66 supporting and separating resistance ribbons 36a, 36b, 36c and 36d while electrically isolating the current flow paths therethrough from first end post 70 to second end post 72. Second end post 72 provides a grounding terminal supporting resistance ribbons 36 and includes only conducting spacers 64 electrically connecting resistance ribbons 36a, 36b, 36c and 36d to grounded mounting member 18.

As reflected in FIGS. 4, 5 and 6, resistance ribbons 136 may also be electrically connected in series with battery 140. In this arrangement, first end post 170 is connected to battery 140 and a conducting spacer 164a is in contact with bolt head 152 thereby allowing current to flow into lowermost resistance ribbon 136a as best seen in FIG. 5. However, as illustrated in FIG. 5, at first end post 170 an insulating spacer 166b is in contact with lowermost resistance ribbon 136a thereby preventing the flow of electric current to second resistance ribbon 136b. Rather, as will be appreciated by those skilled in the art, all of the current flowing through bolt 151 passes into lowermost resistance ribbon 136a at first end post 170 and passes therethrough and into conducting spacer 164b mounted on second end post 172 (FIG. 6).

As best seen in FIG. 6, the spacers disposed on second end post 172 include an insulating spacer 166a between bolt head 152 and lowermost resistance ribbon 136a, a conducting spacer 164b between resistance ribbons 136a and 136b, an insulating spacer 166c between resistance ribbons 136b and 136c, a conducting spacer 164d between resistance ribbons 136c and 136d and an insulating spacer 166e between resistance ribbon 136d and mounting member 118. As will be appreciated by those skilled in the art, the arrangement of spacers 164 and 166 on first and second end posts 170, 172 connects resistance ribbons 136a, 136b, 136c and 136d in series and causes the electric current from battery 140 to flow through resistance ribbon 136a in the direction of second end post 172, through resistance ribbon 136b in the direction of first end post 170, through resistance ribbon 136c in the direction of second end post 172, and through resistance ribbon 136d in the direction of first end post 170. Upon exiting resistance ribbon 136d, the electric current passing therethrough enters conducting spacer 164e on first end post 170 and passes into grounded mounting member 118.

It will be appreciated that intermediate mounting posts 174, disposed between first end post 170 and second end post 172, include only insulating spacers 166 contacting and separating resistance ribbons 136a, 136b, 136c and 136d when heating element 115 is connected in series just as when heating element 15 of the heating device 10 is connected in parallel.

While two embodiments of heating device 10, 110 have been discussed and illustrated with respect to the location and orientation of heating element 15, 115 relative to mounting member 18, 118, it should be appreciated by those skilled in the art that other arrangements of heating element 15, 115 may be provided without departing from the intended scope of this disclosed and the appended claims. Further, it should also be appreciated that variations to the disclosed mounting posts 38, 138 and securing means 50, 150 disclosed herein may also be made without departing from the disclosed invention.

Various other advantages and modifications will become apparent to one skilled in the art after having the benefit of studying the teachings of the specification, the drawings and the following claims.

What is claimed is:

1. A heating device for use in an internal combustion engine comprising:

a frame including means for attaching said frame to an engine;

first and second resistance ribbons;

a first mounting post coupling said first and second resistance ribbons to said frame, said first mounting post electrically connected to a power source;

a second mounting post coupling said first and second resistance ribbons to said frame, said second mounting post electrically connected to ground; and securing means for selectively coupling said first and second resistance ribbons to said first and second mounting posts in one of a first arrangement wherein said first and second resistance ribbons are electrically connected in parallel with the power source and a second arrangement wherein said first and second resistance ribbons are electrically connected in series with the power source.

2. The heating device of claim 1 wherein said securing means electrically connects each of said at least two resistance ribbons in series with the power source 3. The heating device of claim 1 wherein said securing means electrically connects each of said at least two resistance ribbons in parallel with the power source.

4. A heating device for use in an internal combustion engine comprising:

a frame including means for attaching said frame to an engine;

a plurality of mounting posts coupled to said frame;

at least two resistance ribbons; and securing means for coupling said at least two second resistance ribbons to said plurality of second mounting posts, said securing means including a plurality of insulating and conducting spacers cooperative with and arrangable upon said mounting posts to electrically connect said at least two resistance ribbons in series or in parallel with a power source.

5. The heating device of claim 4 wherein each of said plurality of mounting posts include a bolt having threads, wherein said frame further includes a plurality of apertures cooperative with said bolts, and wherein said securing means further includes a threaded nut cooperative with said threads on said bolts to removably couple said bolts to said frame, and a plurality of insulator bushings for electrically isolating each of said threaded nuts and bolts from said frame.

6. The heating device of claim 5 wherein each of said bolts further include a body portion and wherein said mounting posts further include an insulating sleeve disposable on said bolts to electrically insolate said body portion from said resistance ribbons and said conducting spacers.

7. The heating device of claim 6 wherein said mounting posts have a diameter, wherein each of said at least two resistance ribbons include a first end defining a first mounting aperture having a diameter and a second end defining a second mounting aperture having a diameter, wherein said insulating sleeves have an inner diameter greater than the diameter of said posts and an outer diameter, said spacers have an inner diameter greater than the outer diameter of said insulating sleeves and an outer diameter, and wherein said diameters of said first and second mounting apertures are not greater than the outer diameter of said spacers.

8. The heating device of claim 7 wherein said plurality of mounting posts include a first end post and a second end post, said first ends of each of said at least two resistance ribbons coupled to said first end post and said second ends of each of said at least two resistance ribbons coupled to said second end post, said first end post being electrically connected to a power source.

9. The heating device of claim 8 wherein each of said bolts includes a head and a threaded end, said threaded end being cooperative with said mounting nut to compressibly secure said resistance ribbons and spacers between said bolt head and said frame.

10. A heating device for use in an internal combustion engine including a cylinder head having an intake opening, said heating device comprising:

a frame connectable to the cylinder head of an internal combustion engine, said frame including a flange portion and an air intake opening;

at least two, resistance ribbons;

a plurality of mounting posts coupled to said frame for removably mounting said at least two resistance ribbons substantially perpendicular to said flange portion of said frame; and securing means for coupling said at least two resistance ribbons to said plurality of mounting posts in parallel or in series with a power source.

11. The heating device of claim 10 wherein said frame further includes a cylinder head intake cover integral with said flange portion of said frame, with said air intake opening in said frame being formed in said cover.

12. The heating device of claim 10 wherein said securing means electrically connects each of said at least two resistance ribbons in series with the power source.

13. The heating device of claim 10 wherein said securing means electrically connects each of said at least two resistance ribbons in parallel with the power source.

14. The heating device of claim 10 wherein said securing means further includes spacers removably coupled to said plurality of mounting posts and separating each of said at least two resistance ribbons, said spacers include insulating spacers and conducting spacers cooperative with and arrangable upon said mounting posts to electrically connect said at least two resistance ribbons in series or in parallel.

15. The heating device of claim 14 wherein said mounting posts further include a body portion having insulating material coupled thereto to electrically insulate said body portion from said resistance ribbons and said spacers.

16. The heating device of claim 15 wherein said insulating material is an insulating sleeve cooperatively disposed about said body portion of said mounting posts.

17. The heating device of claim 14 wherein said plurality of mounting posts include a first end post and a second end post and wherein each of said at least two resistance ribbons include a first end coupled to said first end post and a second end coupled to said second end post, said first end post being electrically connected to a battery.

18. The heating device of claim 14 wherein each of said plurality of mounting posts include a bolt having a head and threads, wherein said frame further includes a plurality of apertures cooperative with said bolts, wherein said securing means further includes a threaded nut cooperative with said bolt threads to removably couple said bolts to said frame and to compressibly secure said resistance ribbons and spacers between said bolt head and said frame, and wherein said securing means further includes insulator bushings electrically isolating each of said threaded nuts and bolts from said frame.

19. A heating device for use in an internal combustion engine including a cylinder head having an intake opening, said heating device comprising:

a frame connectable to the cylinder head of an internal combustion engine, said frame including a flange portion and an air intake opening;

at least two resistance ribbons;

a plurality of mounting posts coupled to said frame for removably mounting said at least two resistance ribbons to said frame, said plurality of mounting posts extending into said air intake opening of said frame; and securing means for coupling said at least two resistance ribbons to said plurality of mounting posts in parallel or in series with a power source.

20. The heating device of claim 19 wherein said flange portion of said frame includes an inner side surface defining the perimeter of said air intake opening of said frame, said mounting posts extending substantially perpendicular to said inner side surfaces of said flange portion into said air intake opening of said frame.

21. The heating device of claim 19 wherein said securing means electrically connects each of said at least two resistance ribbons in series with the power source.

22. The heating device of claim 19 wherein said securing means electrically connects each of said at least two resistance ribbons in parallel with the power source.

23. The heating device of claim 20 wherein said securing means further includes spacers removably coupled to said plurality of mounting posts and separating each of said at least two resistance ribbons, said spacers include insulating spacers and conducting spacers cooperative with and arrangable upon said mounting posts to electrically connect said at least two resistance ribbons in series or in parallel.

24. The heating device of claim 23 wherein said mounting posts further include a body portion and an insulating sleeve disposed about said body portion to electrically insulate said body portion from said resistance ribbons and said spacers.

25. The heating device of claim 23 wherein said plurality of posts include a first end post and a second end post and wherein each of said at least two resistance ribbons include a first end coupled to said first end post and a second end coupled to said second end post, said first end post being electrically connected to a battery.

26. The heating device of claim 25 wherein each of said plurality of mounting posts include a bolt having a head and threads, wherein said flange portion of said frame further includes an outer side surface and a plurality of apertures cooperative with said bolts extending from said inner side surface to said outer side surface of said flange portion, wherein said securing means further includes a threaded nut cooperative with said bolt threads to removably couple said bolts to said frame and to compressibly secure said resistance ribbons and spacers between said bolt head and said frame, and wherein said securing means further includes insulator bushings electrically isolating each of said threaded nuts and bolts from said frame.

* * * * *